Patented Sept. 19, 1950

2,522,750

UNITED STATES PATENT OFFICE 2,522,750

METHOD FOR PREPARING CARBON BRUSHES FOR ELECTROTECHNICAL PURPOSE

Jean Baptiste Deschamps, Gennevilliers, France, assignor to Societe: Le Carbone-Lorraine, a corporation of France No Drawing. Application November 26, 1946, Serial No. 712,229. In France November 17, 1942

Section 1, Public Law 690, August 8, 1946
Patent expires November 17, 1962

11 Claims. (Cl. 171—325)

1

This invention relates to electrical current collecting contact devices and more especially to carbon or graphite brushes operating in contact with rotating metallic current collectors of dynamo-electric machinery or apparatuses. It is an object of this invention to provide contact brushes of the kind aforesaid which are better fitted for use in an atmosphere relatively poor in oxygen and quite especially in the atmosphere existing at high altitudes, than contact brushes hitherto devised.

It is a fact well known to those skilled in the art that brushes of known composition, when operating in aircraft flying in the stratosphere are subject to rapid wear and disintegration and require being replaced at short intervals. At high altitudes the percentage of oxygen in the air drops very materially and the temperature as well as the content of moisture of the air differ critically from atmospheric conditions near the ground. Apparently the lack of oxygen plays a major rôle in the creation of rapid destruction of the brushes and the metallic current collectors.

I have found by experiment, and my findings have been corroborated in practical use on a large scale, that the life of contact brushes operating in an atmosphere such as exists at high altitudes and which is characterized, in the first place, by a considerable reduction of the oxygen content as compared with air conditions near the ground, is greatly lengthened and contact conditions materially improved if the deficiency in oxygen is made up for by a supply of free oxygen in and/or around the body of a brush.

I am thus enabled, in accordance with my invention to prevent an early deterioration or destruction of carbon or graphite brushes of electrical devices in an atmosphere poor in oxygen by storing in the body of the brush a supply of oxyger adapted to become available as free oxygen under working conditions.

This method of improving the life of the brushes under adverse conditions is one object of my invention. The products of this method are another object.

These products are brushes containing in their bodies a supply of oxygen capable of being set free under working conditions. The brush bodies may contain a substance known as an oxidant. Mixtures of a plurality of oxidants may be present with advantage. The mass constituting the brush body may for instance contain a salt or salts of oxygenated compounds.

In producing such improved carbon brushes, it is preferable to impregnate a suitably chosen

2 electrically conductive and porous agglomerated substance with a concentrated solution of an oxidizing salt, such impregnation being followed by drying. The impregnation may be effected at ordinary or raised temperature and under a pressure above normal. The temperature should however not be so high as to cause reduction of the oxidizing compound by the impregnated material. The latter may have as a base amorphous carbon or natural or artificial graphite, and it may have been submitted to a thermic graphitation treatment before impregnation. The impregnating treatment is extended either to the slabs which are used in forming the brushes or to the brush bodies themselves. In the latter case, it is possible if desired to limit the impregnation to the operative part of the brush without impregnating the head.

In actual practice, the mass to be impregnated is formed in accordance with the usual methods used in the formation of carbon brushes for electrical purposes in order that the mass may possess the toughness and the conductivity required for its use. Preferably, the pores open to impregnation should amount to at least 15% of the total volume. The parts are immersed in the salt solution and the inhibition may be furthered if required through the action of vacuum in order to eliminate the air enclosed inside the pores; after their immersion pressure above normal is exerted to accelerate the impregnation. The duration of the impregnation process may vary between about half an hour and 24 hours according to the density of the product, the mean diameter of the pores and the size of the parts. When this operation has come to an end, the solvent is evaporated either under atmospheric pressure or preferably under reduced pressure until the desiccation is complete.

As an impregnating material, it is possible to use either individual oxidants or mixtures thereof. The latter are preferable when the compound solution of several salts is adapted to contain in a given volume an amount of oxygen incorporated in these salts which is higher than that contained in the solution of an individual. It is possible to use in a successful manner nitrates, perchlorates, iodates, chromates, molyldates, tungstates, manganates, permanganates, antimoniates, etc. Among the salts of a same type it is preferable to use those the solubility of which is the highest; sodium nitrate is to be preferred to potassium nitrate because it is much more soluble. Alkaline earth perchlorates mixed with alkali permanganates also provide favorable results. The same is the case with simple chromates and polychromates.

The carbon brushes thus impregnated may be subjected to further treatments such for instance as an impregnation with lubricants or water-repelling substances, for instance mineral oils, vaseline oil, paraffine or else natural fatty substances or certain synthetic resins. It is also possible to protect the salts contained in the pores by providing a superficial coating on the brush, which coating is retained only during the time of stocking the brush before use. To this end, the superficial layer of the finished brushes is impregnated by means of a nitrocellulosic or acetocellulosic solution, which is dried so as to leave in place the cellulosic derivative serving as a protecting coating.

Example

Carbon brushes having as a base amorphous technically pure carbon with an apparent porosity of 18% are impregnated at 100° C. with a solution of sodium nitrate at the saturation point for this temperature. The brushes are progressively immersed at the speed of 10 mm. per hour. When the immersion is at an end a pressure of 5 kgs. per sq. cm. is exerted on the immersed brushes by means of compressed air. The brushes are allowed to stay under pressure. Atmospheric pressure is then restored and the brushes are taken out of the liquid and kiln-dried between 80 and 100° C. in vacuo during 6 hours. They are allowed to cool in a room the atmosphere of which is dried by means of calcium chloride. They are then immersed during about one to three minutes in a 6 per cent acetone solution of nitrocellulose containing 12 to 13% of nitrogen. The brushes are then removed from the solution and dried in vacuo. These brushes work in a satisfactory manner in an atmosphere practically devoid of oxygen the temperature of which is near 60° C. below zero.

What I claim is:

1. A carbon brush for electrical purposes containing sodium nitrate and nitro-cellulose containing from about 12 to about 13% nitrogen.

2. A carbon brush for electrical devices, consisting essentially of carbon and a water soluble substance capable of giving up free oxygen in an atmosphere poor in oxygen, said substance being selected from the group consisting of nitrates, perchlorates, iodates, chromates, molybdates, tungstates, manganates, permanganates and antimonates of alkali metals.

3. A carbon brush for electrical devices, consisting of carbon and a water soluble substance capable of giving up free oxygen in an atmosphere poor in oxygen, said substance being selected from the group consisting of nitrates, perchlorates, iodates, chromates, molybdates, tungstates, manganates, permanganates and antimonates of alkali metals.

4. A carbon brush for electrical devices, consisting essentially of carbon and an oxygen compound capable of giving up free oxygen in an atmosphere poor in oxygen, said compound being an alkali metal nitrate.

5. A carbon brush for electrical devices, consisting of carbon and an oxygen compound capable of giving up free oxygen in an atmosphere poor in oxygen, said compound being an alkali metal nitrate.

6. A carbon brush for electrical devices, consisting essentially of carbon and an oxygen compound capable of giving up free oxygen in an atmosphere poor in oxygen, said compound being sodium nitrate.

7. A carbon brush for electrical devices, consisting of carbon and an oxygen compound capable of giving up free oxygen in an atmosphere poor in oxygen, said compound being sodium nitrate.

8. A carbon brush for electrical devices consisting essentially of carbon and an oxygen compound capable of giving up free oxygen in an atmosphere poor in oxygen, said compound being potassium nitrate.

9. A carbon brush for electrical devices, consisting of carbon and an oxygen compound capable of giving up free oxygen in an atmosphere poor in oxygen, said compound being potassium nitrate.

10. A carbon brush for electrical devices, consisting essentially of carbon and a substance capable of giving up free oxygen in an atmosphere poor in oxygen, said substance being a mixture of the permanganate of an alkali metal and the perchlorate of an alkaline earth metal.

11. A carbon brush for electrical devices, consisting of carbon and a substance capable of giving up free oxygen in an atmosphere poor in oxygen, said substance being a mixture of the permanganate of an alkali metal and the perchlorate of an alkaline earth metal.

JEAN BAPTISTE DESCHAMPS.

REFERENCES CITED

The following references are of record in the file of this patent:

UNITED STATES PATENTS

| Number | Name | Date |
| --- | --- | --- |
| 408,358 | Schroeder | Aug. 6, 1889 |
| 875,750 | Van Nort | Jan. 7, 1908 |
| 901,966 | Harrison | Oct. 27, 1908 |
| 1,809,360 | Schutte | June 9, 1931 |
| 1,895,756 | Fuller | Jan. 31, 1933 |
| 2,062,074 | Wagner | Nov. 24, 1936 |
| 2,074,885 | Bender | Mar. 23, 1937 |
| 2,131,021 | Bemis | Sept. 27, 1938 |
| 2,288,633 | Luckhaupt | July 7, 1942 |
| 2,368,306 | Kiefer | Jan. 30, 1945 |
| 2,414,514 | Elsey | Jan. 21, 1947 |
| 2,445,003 | Ramadanoff | July 13, 1948 |